United States Patent [19]

Cringle et al.

[11] Patent Number: 4,690,740
[45] Date of Patent: Sep. 1, 1987

[54] METHOD FOR MAINTAINING EFFECTIVE CORROSION INHIBITION IN GAS SCRUBBING PLANT

[75] Inventors: David C. Cringle, Angleton; Roscoe L. Pearce, Lake Jackson; Michael S. DuPart, Alvin, all of Tex.

[73] Assignee: The Dow Chemical Company, Midland, Mich.

[21] Appl. No.: 837,230

[22] Filed: Mar. 7, 1986

[51] Int. Cl.⁴ .................. C23F 13/00; B01D 53/34
[52] U.S. Cl. ............................. 204/147; 204/86; 204/87; 422/13; 423/229
[58] Field of Search ................ 204/86, 87, 91, 93, 204/94, 147, 196; 422/13; 423/229, 228

[56] References Cited

U.S. PATENT DOCUMENTS

| | | | |
|---|---|---|---|
| 679,985 | 8/1901 | Palas et al. | 204/93 |
| 2,273,798 | 2/1942 | Heise et al. | 204/94 |
| 3,241,512 | 3/1966 | Green | 204/147 |
| 3,661,742 | 5/1972 | Osborne et al. | 204/196 |
| 4,624,839 | 11/1986 | Wolcott t al. | 423/229 |

Primary Examiner—T. Tung
Attorney, Agent, or Firm—R. G. Baker

[57] ABSTRACT

Herein is described a technique for maintaining a copper ion in the plus 2 oxidation state, as it is employed as an inhibitor in an alkanolamine gas conditioning absorbent solution to provide corrosion protection of the metals in contact with the alkanolamine solution. The procedure disclosed for maintaining copper in the plus 2 state is to apply an induced or impressed voltage across a point, or several points, in the circulating copper containing solution of the gas conditioning plate for the recovery of $CO_2$ from flue gas particularly when oxygen is present in the gas being treated.

2 Claims, 3 Drawing Figures

METHOD FOR MAINTAINING EFFECTIVE CORROSION INHIBITION IN GAS SCRUBBING PLANT

BACKGROUND OF THE INVENTION

Copper is a relatively well known inhibitor for gas conditioning fluids which employ the alkanolamines in their aqueous solution to absorb various gases from natural and synthetic hydrocarbon gas streams. To be an effective corrosion inhibitor copper must be in the form of a plus 2 valence state, for in this state copper ion is soluble in aqueous alkanolamine solutions. A problem which has been recognized to exist for many years is that the copper undergoes reduction to copper with a valence state of plus 1 or even copper zero at which latter point the copper plates out on the metal surface of the interior of the operating elements of a plant. Various methods have been suggested for converting the copper from copper zero or copper one to copper two and include the use of potassium permanganate. However, the use of such, while converting the copper from copper zero to copper one to copper two produces a precipitate of manganese oxide and the chemicals undergo side reactions with for example MEA, the $CO_2$ being absorbed or other compounds present in the process. Another proposed means for maintaining copper in solution in the plus 2 state of oxidation is to periodically remove the solution and reoxidize the copper metal or copper one that has not plated out and is still soluble in the solution to copper two and then filter the solution to remove the precipitates and the degradation products resulting from the side reactions. Another technique employed on occasion is the direct addition of oxygen to the process in the reductive section of the plant, but such an addition of oxygen accelerates the oxidation and degradation of the MEA and contaminates the $CO_2$ because excess oxygen, that is oxygen not reacted in the oxidation of the copper, will pass through the process and exit with the $CO_2$ product.

It would, therefore, be advantageous to provide a process which does not increase the chemical cost, the operating cost, nor contaminate the product.

BRIEF DESCRIPTION OF THE INVENTION

In accordance with the present invention, it has now been found that by inducing a voltage or directing a voltage across the alkanolamine solution which contains copper, preferably in the reboiler section of the plant, there is obtained a sufficient oxidative condition to maintain the copper in the plus two state. Alternatively, one or more pairs of electrodes may be placed at any point or at several points in the plant thereby insuring that copper is always at a copper two state and eliminating a condition in the plant at which copper could be reduced and plated out.

The amount of impressed voltage employed is dependent upon the degree and rate of reduction of the copper which is, in part dependent upon the reduction potential (degradative rate) of the solvent. This is related to the amount of oxygen, carbon dioxide and other compounds that are absorbed therein and the process solution temperature. Also, the concentration of the alkanolamine will be a factor since the higher the concentration of the amine in the aqueous solution, the greater is the corrosion rate therefore the greater the use of the copper to prevent this corrosion.

The present invention also involves treating all or a portion of the alkanolamine solution, at any temperature, typically by passing a solution, cool rich or cool lean (conveniently the lean solution after heat exchange with the rich solution from the contactor), into and through a mechanical filter, into and through activated carbon, and/or into and through a second mechanical filter. Following this treatment, the carbon treated and/or filter treated solution may be, and, is preferably, passed through an ion exchange resin bed thence to the top of the contactor.

The above procedure surprisingly effectively removes ionic iron and solvent degradation products. This in combination with the impressed voltage maintains sufficient ionic copper in solution to substantially abate corrosion, minimizes the formation of degradation products, and maintains substantially the efficiency of the alkanolamine solution.

It is to be understood that while the above preferred mode of operation includes the activated carbon treatment, mechanical filtration and ion exchange treatment, some improvement, e.g. lower corrosivity and/or degradative quality of solvent, can be achieved if only one of the unit operations is employed in combination with the impressed voltage in treating the solvent. Thus, under certain operating conditions, activated carbon treatment can remove certain of the degradation products both by adsorption and/or absorption and its inherent filtering effects such as mechanical removal of particulate material to obtain some improvement. It however has been found advantageous to couple the induced voltage step with mechanical filtration both before and after activated carbon treatment to extend the life of the carbon bed and collect the insoluble iron. Ion exchange treatment may also be employed in combination with the induced voltage, to remove some of the degradation products, with or without either mechanical filtrations or activated carbon treatment, but without mechanical filtration, the bed must be cleaned more often to avoid plugging with insoluble iron or other solid degradation products. Here again, mechanical filtration is preferred to keep at a low level the insoluble iron and/or solid degradation products and thus prevent these materials from plugging the bed. Likewise, the use of one or both filtration mediums as the only treatment will improve the operation of the process in combination with the induced voltage but not to the same degree as operating the three unit operations, i.e. mechanical filtration, activated carbon treatment, and ion exchange.

BRIEF DESCRIPTION OF THE DRAWINGS

The present invention is illustrated by

DETAILED DESCRIPTION OF THE DRAWINGS

Figure 1:
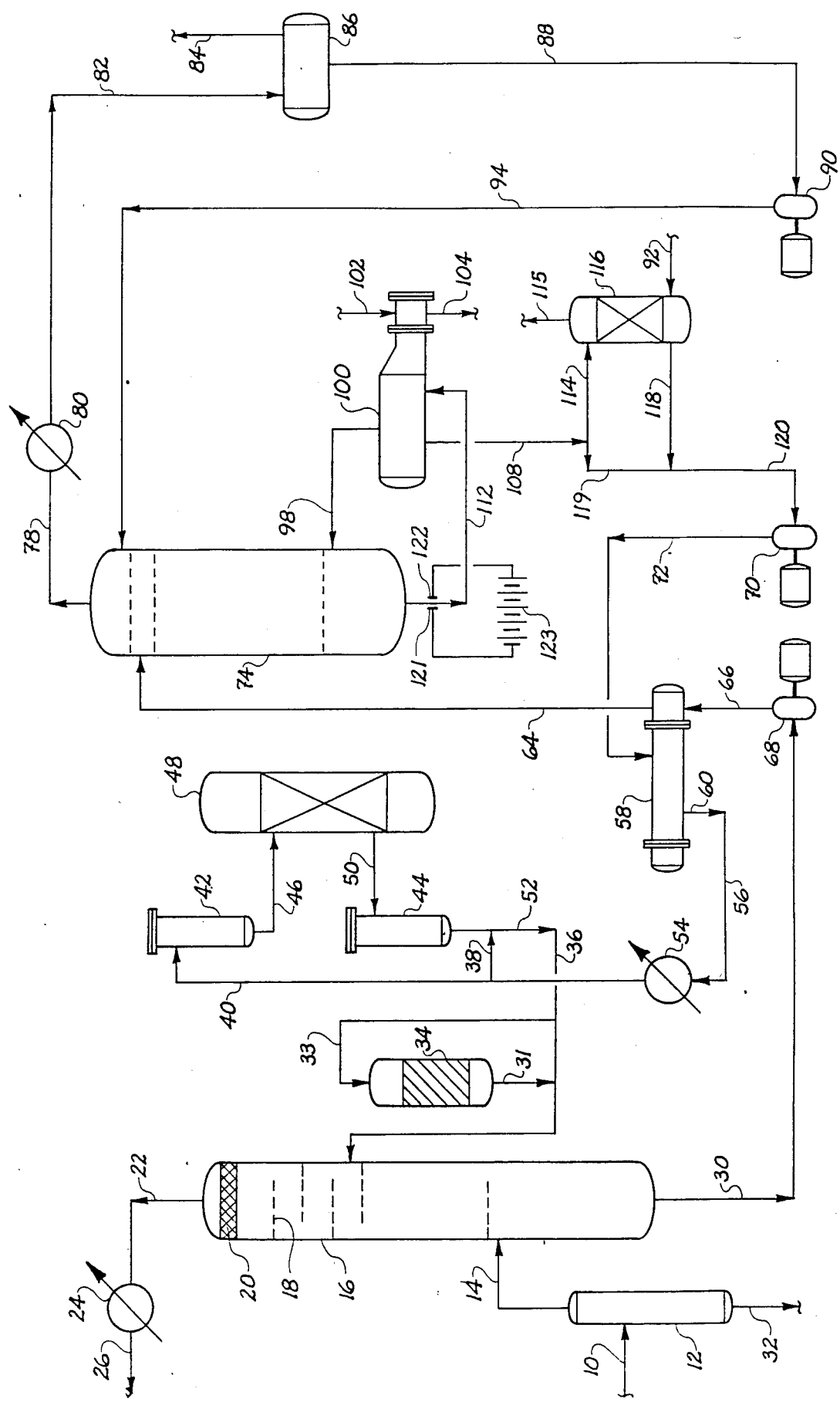
FIG. 1 which is a schematic diagram of a typical commercial operation showing the association of the contactor 16 with the stripper 74, the activated carbon bed 48, mechanical filters 42 and 44, and ion exchange bed 34 and the electric potential probes 121 and 122.

In FIG. 1 of the drawings, 10 represents an inlet line for the flue gas or gas from an internal combustion engine to be treated. A knock-out drum 12 with drain line 32 is provided to collect liquid condensates. From the drum 12, line 14 leads the flue gases into absorber 16 which has a plurality of trays 18 and a demister 20.

The effluent gases from the absorber 16 are led by line 22 optionally to a condensor 24 and to outlet line 26

Recirculating alkanolamine solution is led by line 36 into the absorber 16 and the rich amine solution i.e., amine containing absorbed $CO_2$, leaves the absorber by exit line 30 and thence to the inlet of pump 68. From the pump outlet 66, the rich amine solution flows through the crossexchanger 58 and line 64 to the inlet of the stripper 74 wherein the rich amine is heated and stripped of carbon dioxide. The $CO_2$ is removed by outlet 78 where it flows through a condensor 80 and then by line 82 to a condensate collector 86. The pure $CO_2$ gas is removed by line 84 and the condensate is removed by line 88 for reuse by passing it through a pump 90 and line 94 back to the stripper 74.

At the bottom of the stipper 74, there is provided an outlet line 112 which leads the alkanolamine solution to the inlet of the reboiler 100. The heated vapor returns to the stipper by line 98. It is convenient at this point, i.e. in line 112, to place the probes 121 and 122 across the hot stripped (lean) solution. A source of voltage is impressed from power supply 123 illustrated as a battery for simplification in the drawing. Steam (here described but other sources of heat may be used) lines 102 and 104 provide an inlet and an outlet for the steam to heat the reboiler 100.

The heated lean alkanolamine solution leaves the reboiler 100 by lines 108, 119 and 120 where the solution is recirculated by pump 70 and the associated line 72 to the heat exchanger 58. A portion of the lean alkanolamine solution can be withdrawn by line 114 and oxidized with an oxygen containing gas such as air in the oxidizing unit 116. Line 118 is provided to return the oxidized solution back to the main line joining that portion 120 if any, in line 119 from line 108 to form the lean solution in line 120. Oxidizing gases are provided by inlet 92 and the used gases are removed by outlet 115.

From the heat exchanger 58, the alkanolamine solution flows by line 60 and 56 to an amine cooler 54 and thence by line 40 to a cartridge filter 42 for removal of fine particulates. From the filter 42 the solution goes by line 46 to an activated carbon bed 48 and thence by line 50 to a second cartridge filter 44 for the removal of carbon fines.

Line 52 is provided to lead the solution back to the absorber by line 36. If desired, part or all of the solution can be passed by line 33 to a ion exchange bed 34 having an outlet line 31 for further purification of the solution prior to reuse. It is to be understood that in the above description the necessary valves and controls have not been illustrated in order to clearly point out the invention. It is also understood that some of the solution will by-pass the filtration/purification section through line 38.

DETAILED DESCRIPTION OF THE INVENTION

With a brief description of the unit operations which constitute the present invention, the limits of operating parameters are now set forth.

Figure 2:
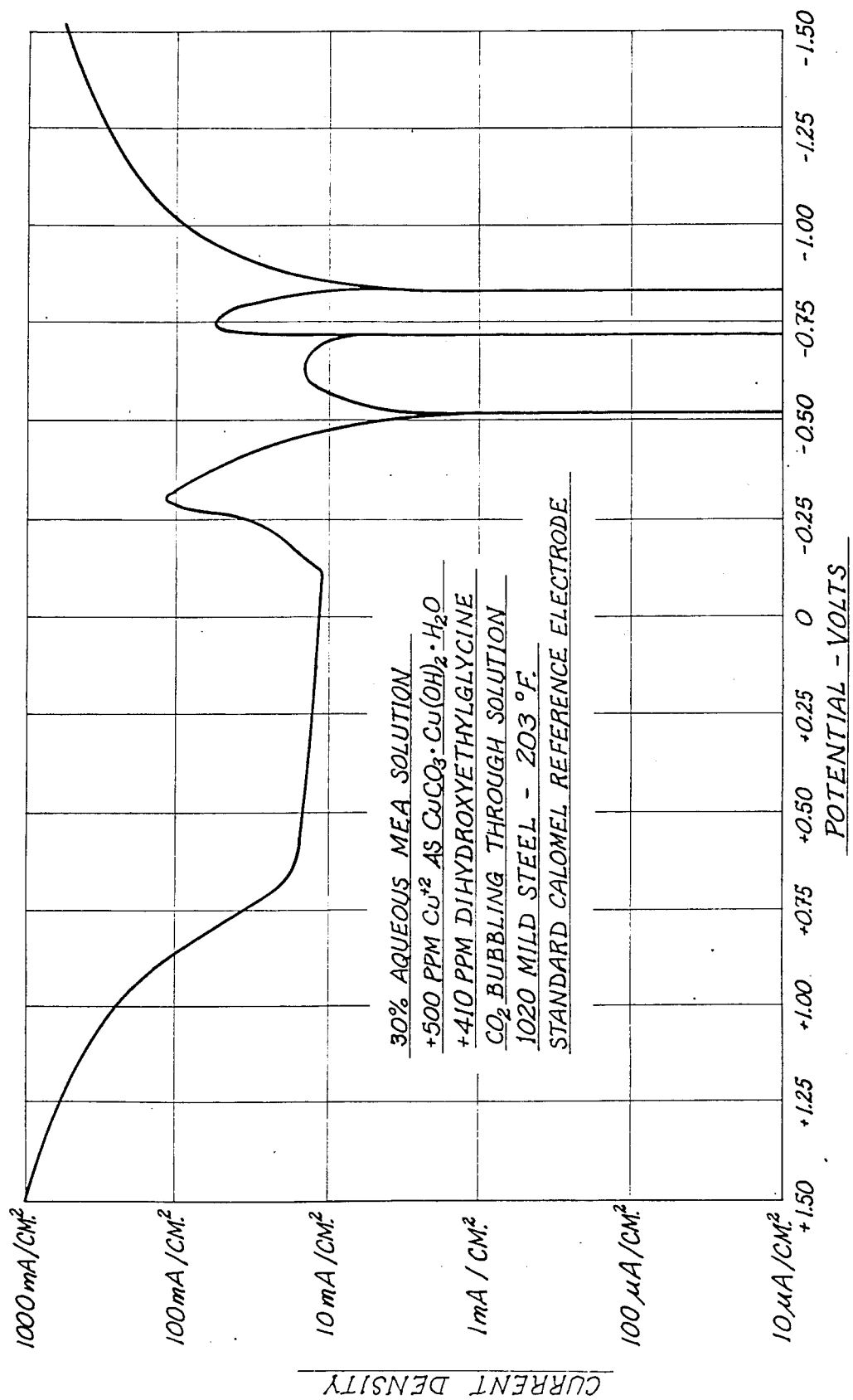
FIG. 2 illustrates a plot of the data obtained using a glass apparatus containing a conventional acid gas absorbing solution across which a voltage was impressed between two 1020 weld steel electrodes immersed in the solution spaced about 3 inches apart.
Figure 3:
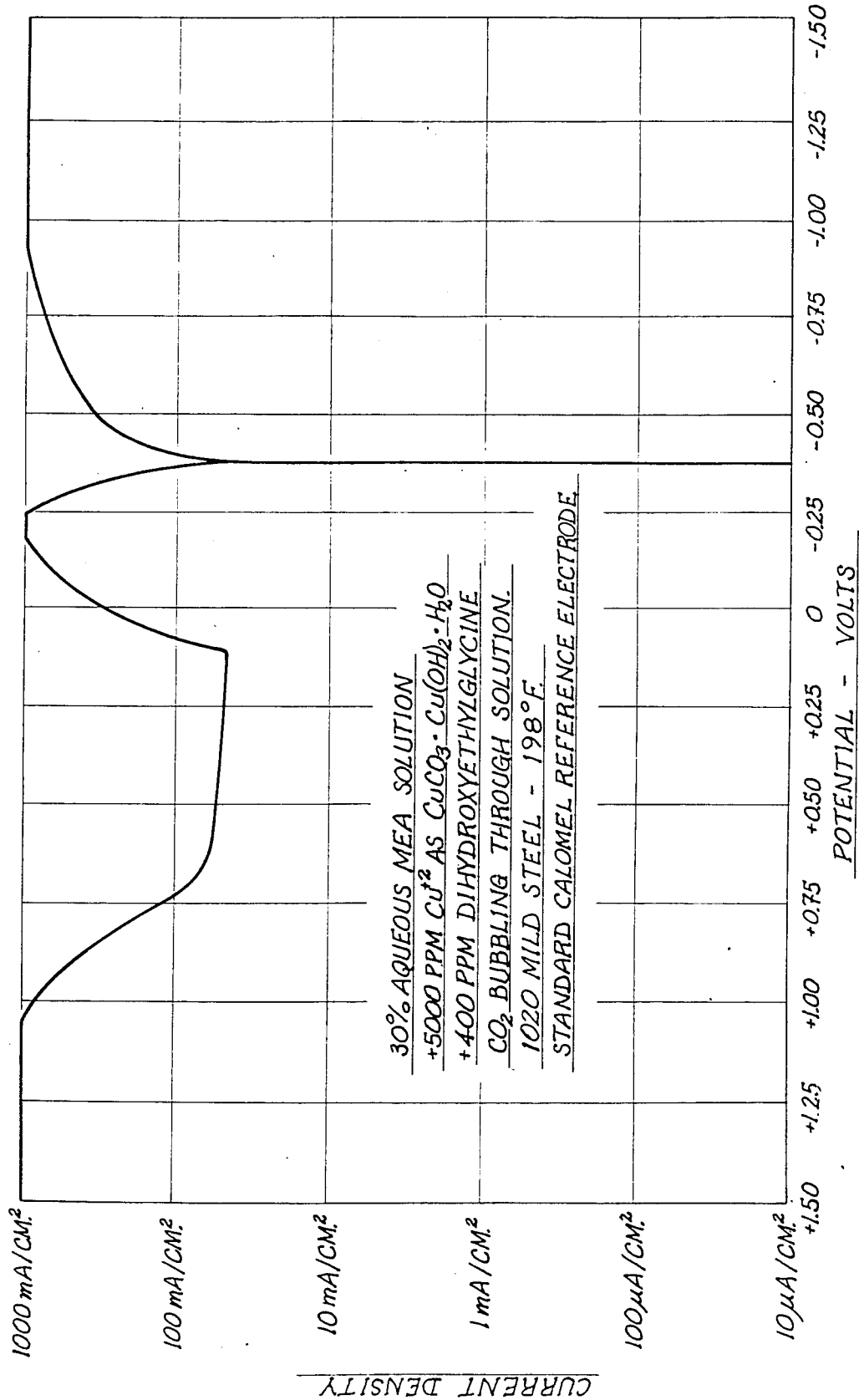
FIG. 3 is a similar plot highly loaded with copper inhibitor.

Induced voltage—The amount of induced voltage is determined by applying an anodic potential across the solution and determining by potentiokinetic methods the range of potential (voltage) where the current density remains substantially constant. As shown in FIGS. 2 and 3 the range for maintaining copper in a 30% monoethanol amine solution containing 500 to 5000 parts per million copper is from about +0.8 to about −0.10 volts, and preferably from +0.70 to about +0.05 volts.

Inhibitor—The inhibitor of choice for this particular system is ionic copper introduced as any salt soluble in the alkanolamine solution in a concentration greater than about 5 ppm by weight based on the total solution. The preferred soluble salt is copper carbonate. The preferred range is between about 50 ppm and about 750 ppm and the most preferred range is between about 100 ppm and about 500 ppm copper, however it is not implied that greater concentrations of copper are not effective since concentrations in excess of 2000 ppm have been successfully used as illustrated by FIG. 3. It has been shown by both laboratory data and pilot plant data that passivation of the corrosion process can be achieved and maintained even in concentrations less than 50 ppm. Likewise, it has been established that between about 5–80% concentration of MEA can be effectively inhibited against corrosion by maintaining a proper level of copper in the treating solution.

Alkanolamine concentration—from about 5 to about 80 percent solutions of alkanolamine may be employed with reduced corrosion and reduced solvent degradation resulting in improved life of solvent, that is, longer periods between turnarounds or unscheduled down times to replace the solvent. Primary, secondary, and tertiary alkanolamines, or mixtures thereof, may be employed, the preferred alkanolamine being monoethanolamine from about 25 to about 50 percent by weight. It has been found from pilot plant data that the incorporation of the present invention results in little or no downtime occasioned by corrosion and/or necessity to replace the solvent.

Temperature control—It has been found that the reduction of active copper ion content, in for example, monoethanolamine, is greatly accelerated above about 150° F. and that reboiler bulk temperatures of from about 240° F. to about 260° F. and above are conducive to excessive reduction of copper particularly at increased residence times. It is preferable to maintain the reboiler bulk temperature at or below about 240° F. to about 260° F. Also it is desirable to employ a maximum heat transfer flux of less than about 10,000 BTU and preferably less than about 6,000 BTU per square foot per hour. Higher heat flux and/or residence times will, of course, function but will contribute to a higher rate of copper depletion and thus loss of operability of the overall system.

Contact Pressure—In accordance with the present invention flue gas will be contacted with the alkanolamine at about atmospheric pressure. However, the invention is applicable to higher pressures, limited only by the condensation pressure of the gas mixture being processed.

Mechanical Filer/Activated Carbon Treater—The judicious use of activated carbon coupled with mechanical filtration will remove harmful contaminants resulting from thermal oxidation of alkanolamine, auto-oxidation of alkanolamine, and corrosion of the plant equipment. The activated carbon treaters in conjunction with mechanical filters are utilized for the passage of alkanolamine solution through first a mechanical filter operating in for example the 10–75 micron range, preferably in about the 25–50 micron range for protection of the activated carbon treater which is located immediately downstream. The activated carbon treater will operate to some extent on any of a variety of activated carbons, however it has been found that the most efficient removal for a broad range of degradation products and capacity coupled with longevity of the activated carbon rests with the coal based activated carbons. Allowable bed pressure drop usually determines carbon particle size. A preferred size is in the 12–40 mesh range such as Calgon F-400 or its equivalent.

The carbon treatment removes certain of the degradative products of the alkanolamine which are suspected to be strong iron chelators. Examples of these products are higher molecular weight organic acids. It is reported that these acids are produced from formic acid, generated as a degradation product of the alkanolamines, and oxalic acid which is the further degradation product of formic acid and formates. The primary function of the mechanical filter down stream of the activated carbon bed is to recover insoluble iron and other particulate material that may be released during the activated carbon function. The pore openings may range from about 1 to about 50 microns with the preferred range being between about 5 to about 25 microns. A secondary function is to collect activated carbon fines thus protecting downstream equipment.

To illustrate the significance of adequate solution filtration a pilot plant was operated with and without filtration while measuring the amount of copper and iron in solution. At temperatures sufficient to strip the solution of $CO_2$ and while the solution was being filtered, the concentration of soluble iron was maintained at low enough concentrations to prevent rapid redox with the copper in solution. When the solution was not filtered or when the filter medium, activated carbon, was spent, the soluble iron concentration increased and the soluble copper concentration rapidly decreased until no copper remained in the solution which was followed by the occurrance of corrosion. In the absence of mechanical filtration the carbon itself caught particulate matter and insoluble iron salts which diminished the number of active adsorption sites and reduced the overall efficiency of the filtration process. In addition, insoluble iron which was not removed from the system accelerated the rate of soluble iron buildup as the activated carbon began to lose efficiency or become spent. This experiment established the necessity to carbon filter the solution in order to maintain low iron levels and to mechanical filter the solution in order to increase carbon life and minimize the potential for rapid copper redox as the carbon began to lose efficiency.

The solvent stream is activated carbon treated and filtered full flow or as a partial side stream utilizing 0.025 bed volume per minute to 1 bed volume per minute. The preferred rate is 0.1–0.2 bed volume per minute. The present invention likewise has been surprisingly improved by minimizing both activated carbon bed and solvent temperatures to a 150° F. maximum. Operation in this mode improves the capacity and improves the selectivity for particular degradation species. Due to the relatively low temperature requirements for most efficient operation, it is advantageous to place the activated carbon treater and mechanical filters downstream of the amine cooler just prior to introduction of the lean solution to the absorber.

Ion Exchange—Heat stable salts of a number of varieties and from a number of sources are continually produced and/or inadvertently added to alkanolamine systems, especially those processing oxygen containing gas streams. The majority of these salts such as, for example, sodium chloride, amine oxalate, and sodium nitrate are of a type which are not effectively removed by activated carbon and/or mechanical filtration. However, the fact that these salts promote both solvent degradation and inhibitor reduction makes it necessary to remove them from solution. There are two methods of doing this. The known method is solvent reclamation by distillation. This method is not recommended as it depletes the inhibitor level (Cu is not carried over in the distillation process) and unless controlled very carefully can cause increased solvent degradation. The present invention preferably utilizes ion exchange to remove the anionic portion of the heat stable salt. This is accomplished by passage of the contaminated solvent through any of the number of strong base anion exchange resins of the styrene-divinylbenzene type which have a quaternary amine as their functional group, i.e. DOWEX* 1, DOWEX* 2, DOWEX* MSA-1, DOWEX* MSA-2 (*Trademark of The Dow Chemical Company). The anions present in solution displace the hydroxide groups present on the resin and are removed from solution. After the resin is spent (its exchange capacity fully utilized) the resin may be discarded or regenerated with a sodium hydroxide solution of essentially any concentration. The preferred concentration range being 2–5N. The regeneration effluent, containing the unwanted salts, is then discarded and the resin is ready for reuse.

Exemplary of such ion exchange treatment was the treatment of 100 ml. of a foul 30% MEA solution from the plant which had 300 ppm copper inhibitor and which was carbon treated. The solution was treated by passing it downflow through a 25 ml packed column of DOWEX*1 (OH$^-$ form) (*Trademark of The Dow Chemical Company) at 5 cc/min and 78° F. After discarding the hold-up volume of water, the alkanolamine solution was collected and a sample of both the starting material and resin bed effluent were analyzed for heat stable salt content.

| Sample | % Heat Stable Salt |
|---|---|
| Starting Solution | 2.4 |
| Resin Bed Effluent | 1.8 |

This represents a net one pass removal of heat stable salt of 25%.

There was substantially no loss of copper as a result of the ion exchange treatment.

Inhibitor Regeneration—Regeneration of inhibitor is not normally required as long as the conditions taught by this invention are followed specifically. However, if by improper plant design or non-adherance to the conditions set forth herein, copper metal or copper compounds are formed by the reduction of the copper, this inhibitor exhibits the surprising capability of regenerability. There can be provided a sidestream withdrawal of a portion of the solution from the bottom of the reboiler, going through an external cooler to drop the temperature of the hot lean alkanolamine containing particulate matter (which contains the reduced inhibitor) down to a temperature less than 150° F., preferably or less into a tank or suitable vessel as shown in FIG. 1 in which the solution is aerated with an oxygen-containing gas by a variety of means common to those skilled in the art. The lean solution thus cooled and with the inhibitor regenerated may be returned back to the lean solution downstream of the heat exchanger or any other advantageous spot in the lean circuit.

EXAMPLE 1

To determine the amount of impressed voltage necessary to provide oxidation of the copper to the plus two state and insure passivation of the metal surface several polarization curves were generated using a potentiokinetic method. The potentiokinetic method measures current density over a range of applied potentials between a test electrode and a reference electrode. The range of applied voltage is plotted against current density on an x-y chart. A typical plot is set forth in FIG. 2.

The region where the current density remains fairly flat over a range of impressed voltage is known as the passive region where corrosion is minimal, the flow of ions to and from a surface is minimal. Copper is known to oxidize in the absence of foreign ions at the following potentials:

$$Cu \rightarrow 2e^- + Cu^2 \quad 0.5817 \text{ volts}$$

$$Cu \rightarrow e^- + Cu^{+1} \quad 0.7635 \text{ volts}$$

$$Cu^{+1} \rightarrow e^- + Cu^{+2} \quad 0.3995 \text{ volts}$$

However, in the presence of foreign ions (MEA aqueous solutions could contain carbonate carbamate, and metal ions other than copper) complexes or precipitates will be formed with the copper ion that will affect the potential at which the copper is oxidized to produce passivation.

The following polarization curves were generated and the range of applied potential necessary to oxidize copper and provide passivation were determined for 1020 carbon steel vs. a standard calomel electrode at 200° F.

| | Passivation Potential Range |
|---|---|
| (1) 30% MEA + 5000 ppm $Cu^{+2}$ as $CuCO_3.Cu(OH)_2).H_2O$ + 400 ppm dihydroxyethyl glycine* - $CO_2$ saturated | −.08 (→) +.58 volts |
| (2) 30% MEA + 500 ppm $Cu^{+2}$ as $CuCO_3.Cu(OH)_2.H_2O$ + 1000 ppm dihydroxyethyl glycine - $CO_2$ saturated | −.10 (→) +.65 volts |

Impressed voltages in the range from −0.05 to +0.55 volts have been determined to oxidize copper and insure metal passivation in MEA-Flue gas systems.

The location of the induced or impressed voltage across the solution is not critical, but may be at any point in the system. For convenience the electrodes were placed in the return line from the reboiler to the regenerator column, although they can be placed in the lean solution lines between the reboiler/regeneration column, or before or after the filters or ion exchange bed if such elements are incorporated in the plant. They may even be placed in the rich solution line before or after the cross exchanger.

We claim:

1. In a process for the recovery of carbon dioxide from feed gases containing the same and oxygen in the presence or absence of sulfur compounds, by contacting the gas with a circulating alkanolamine solution which contains cooper in a plus 2 state as a corrosion inhibitor and threating said solution rich in $CO_2$ with heat to release the $CO_2$ thereby producing a lean solution and returning the so treated lean solution to the contacting step, the improvement which comprises
    maintaining an amount of copper in the plus two state in said circulating solution effective to inhibit corrosion, inhibit plating out of said copper and/or reduce degradation of the solvent, by impressing a volume across two electrode in contact with the circulating solution to convert non-plus 2 state copper in said solution to the plus 2 valence state.

2. In a process for the recovery of carbon dioxide from feed gases containing the same and oxygen in the presence or absence of sulfur compounds, by contacting the gas with a circulating alkanolamine solution containing a plus 2 state copper as a corrosion inhibitor and treating said solution rich in $CO_2$ with heat to release the $CO_2$ thereby producing a lean solution and returning the so treated lean solution to the contacting step, including subjecting the circulating solution to at least one of the following operations
    (1) at least one mechanical filter;
    (2) activated carbon bed;
    (3) anion exchange resin; and/or
    (4) any combination thereof;
the improvement which comprises
    maintaining the amount of copper in the plus two state in said circulating solution effective to inhibit corrosion, inhibit plating out of said copper and/or reduce degradation of the solvent by impressing a voltage across two electrodes in contact with the circulating solution to convert said dissolved non-plus 2 state copper to and maintain said copper in the plus two valence state.

* * * * *